United States Patent [19]
Ito et al.

[11] 3,873,121

[45] Mar. 25, 1975

[54] HYDROPNEUMATIC SUSPENSION UNIT FOR MOTOR VEHICLE

[75] Inventors: Naganori Ito; Hiroshi Aikawa, both of Tokyo, Japan

[73] Assignee: Nissan Motor Company Limited, Yokohama, Japan

[22] Filed: Jan. 12, 1973

[21] Appl. No.: 322,990

[30] Foreign Application Priority Data
Jan. 13, 1972 Japan.................................. 47-5508

[52] U.S. Cl............................. 280/124 F, 267/64 A
[51] Int. Cl.............................................. B60g 13/00
[58] Field of Search ..... 280/124 F; 267/64 R, 64 A, 267/64 B, 65 R, 65 D

[56] References Cited
UNITED STATES PATENTS

| | | | |
|---|---|---|---|
| 3,558,153 | 1/1971 | Strauff.............................. | 267/64 A |
| 3,565,413 | 2/1971 | Strauff.............................. | 267/64 A |
| 3,572,679 | 3/1971 | Strauff.............................. | 267/64 A |
| 3,689,103 | 9/1972 | Meulendyk...................... | 280/124 F |

*Primary Examiner*—Philip Goodman
*Assistant Examiner*—John A. Carroll

[57] ABSTRACT

A hydropneumatic suspension unit adapted to be mounted between a wheel supporting means and a body of a wheeled vehicle for maintaining the vehicle body at a substantially constant level irrespective of weight and load of the vehicle. The hydropneumatic suspension unit includes a cylinder having a cylinder head and a cylinder chamber filled with a hydraulic fluid under pressure and connected to the body of the motor vehicle, and a piston slidably accommodated in the cylinder chamber and connected to the wheel supporting means. The hydropneumatic suspension unit also includes a vehicle level adjusting device having a floating piston slidably received in an axial bore formed in the cylinder head and movable to different positions for controlling fluid communication between said cylinder chamber and either an inlet or an outlet. A piston chamber is defined by an end wall of the axial bore and an upper face of the floating piston. This piston chamber is brought into fluid communication with the cylinder chamber by means of a hydraulic fluid passageway formed in the cylinder head which hydraulic fluid passageway is larger in cross section that an orifice formed in the floating piston and which is opened when either one of the inlet and outlet is opened by the floating piston.

9 Claims, 4 Drawing Figures

HYDROPNEUMATIC SUSPENSION UNIT FOR MOTOR VEHICLE

This invention relates to suspension units for a wheeled vehicle and, more particularly, to a hydropneumatic suspension unit adapted for automatically adjusting the level of the vehicle in relation to ground independently of the weight and load of the motor vehicle.

A hydropneumatic suspension unit employed in a known wheeled vehicle usually includes a cylinder having a cylinder chamber filled with a hydraulic fluid and a cylinder head formed with fluid inlet and outlet ports, and a piston slidably accommodated in the cylinder chamber. The cylinder is mounted on a vehicle body whereas the piston is mounted on a wheel supporting means such as an axle. These parts are so arranged as to maintain the effective length of the hydropneumatic suspension unit substantially constant irrespective of the weight and load of the vehicle. This is attained by controlling fluid communications between the cylinder chamber and either one of the inlet and outlet ports. To this end, the hydropneumatic suspension unit is equipped with a vehicle level adjusting device including a valve spool which is normally held in its neutral or equilibrium condition by means of a set of two springs and which is movable to different positions to selectively open and close the fluid inlet and outlet ports formed in the cylinder head. With this construction, the valve spool is liable to oscillate due to irregularities of the road surface since the piston is responsive thereto. In order to avoid oscillation of the valve spool in response to the irregularities of the road surface, it has heretofore been proposed to provide in the valve spool a restricted flow passage or orifice through which the hydraulic fluid is passed into or out of the cylinder chamber. A drawback is encountered with this construction in that the valve spool moves at a very low speed during operation of the vehicle level adjusting device and, accordingly, hydraulic fluid is supplied into or drained off from the cylinder chamber in an excessive amount. This drawback can be overcome by decreasing the flow rate of the hydraulic fluid passing into or out of the cylinder chamber. However, a considerable time will lapse before the proper levelling off of the hydropneumatic suspension unit in consequence of the vehicle as a whole is obtained. If the effective cross-sectional area of the restricted flow passage of the valve spool is reduced with a view of providing quick responsiveness, the valve spool tends to respond to movements of the piston due to irregularities of the road surface and consequently to open and close the fluid inlet and outlet ports of the cylinder chamber frequently thereby causing a high fluid consumption.

It is, therefore, an object of the present invention to provide a hydropneumatic suspension unit for a wheeled vehicle which is adapted to overcome the above-mentioned shortcomings encountered in the prior art devices.

Another object of the present invention is to provide a hydropneumatic suspension unit for a vehicle which is arranged to quickly operate to adjust the body structure of a motor vehicle to a substantially constant level irrespective of the weight and load of the motor vehicle.

Another object of the present invention is to provide a hydropneumatic suspension unit for a vehicle which is adapted to operate without causing significant fluid consumption due to irreguralities of the road surface.

A further object of the present invention is to provide an improved hydropneumatic suspension unit for a vehicle which is adapted to be mounted between a vehicle underbody structure and a wheel supporting means such as an axle.

A still further object of the present invention is to provide a hydropneumatic suspension unit having a novel vehicle level adjusting device by which the vehicle level is quickly adjusted independently of the weight and load of the motor vehicle.

A further object of the present invention is to provide a hydropneumatic suspension unit having a novel vehicle level adjusting device which operates highly reliably without causing excessive fluid consumption.

A yet further object of the present invention is to provide a hydropneumatic suspension unit having a novel vehicle level adjusting device which is simple in construction and easy to manufacture.

These and other objects and advantages of the present invention will become more apparent from the following description when taken in conjunction with the accompanying drawings wherein like or corresponding component parts are designated by the same reference numerals and in which.

Figure 1:
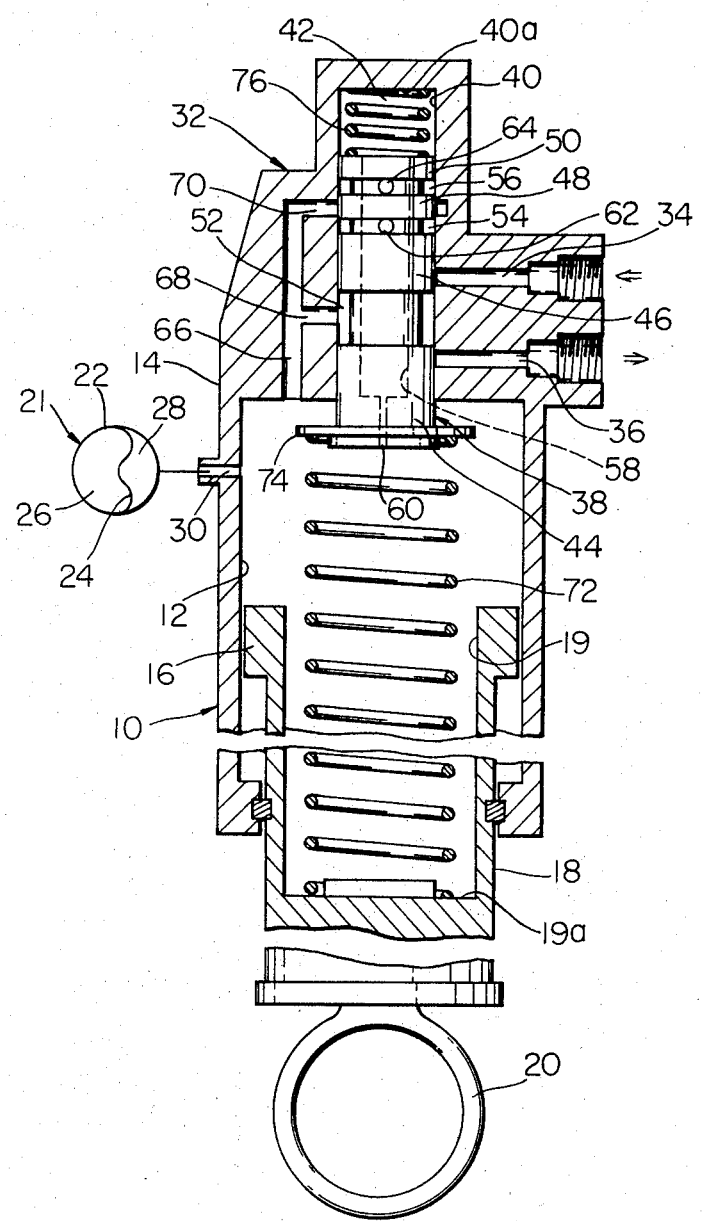
FIG. 1 is a cross-sectional view of a preferred embodiment of the hydropneumatic suspension unit according to the present invention.

Referring now to FIG. 1, there is shown in section a preferred embodiment of the hydropneumatic suspension unit implementing the present invention. The hydropneumatic suspension unit proposed by the present invention is advantageously mounted on a motor vehicle between a vehicle underbody structure and a wheel supporting means such as an axle so that the vehicle body is maintained at a substantially constant level irrespective of the weight and load of the motor vehicle. As shown, the hydropneumatic suspension unit comprises a cylinder body 10 having a cylinder chamber 12 which is formed axially therein. The cylinder body 10 is formed at its upper portion with a cylinder head of hollow member 14 which is mounted on the vehicle underbody structure (not shown). A piston 16 is axially slidably accommodated in the cylinder chamber 12. This piston 16 has a piston rod 18 which extends outwardly of the cylinder chamber 12. The piston rod 18 has formed therein an axially extending bore 19 which terminates with an end wall 19a serving as a spring seat as will be apparent from the subsequent description. The piston rod 18 is formed at its lowermost end with a mounting eye 20 through which the piston rod is connected to the wheel supporting means such as an axle (not shown). With the construction described hereinabove, the cylinder chamber 12 is filled with a hydraulic fluid under pressure which is maintained at a substantially constant level so as to keep the effective length of the hydropneumatic suspension unit at a substantially constant value in a manner as will be subsequently discussed.

In FIG. 1, the hydropneumatic suspension unit according to the present invention is shown as further comprising a hydropneumatic spring unit which is provided for the purpose of dampening the changes in pressure and volume levels of the hydraulic fluid in the cylinder chamber 12 due to relative motions of the cylinder 10 and the piston 16 caused by irregularities on the road surface on which the motor vehicle travels. As shown, the hydropneumatic spring unit, which is generally designated by reference numeral 21, includes a casing 22 which is internally divided by a flexible partition member 24 into separate chambers 26 and 28. The chamber 26 is totally closed by the flexible partition member 24 and is filled with a compressible gas such as nitrogen gas under pressure. The other chamber 28 communicates through a passage 30 with the cylinder chamber 12. The chamber 28 is thus occupied with hydraulic fluid from the cylinder chamber 12. It should be noted that the arrangement constituted by the cylinder body 10, the piston 18 and the hydropneumatic spring unit 21 serve as a shock absorber.

In accordance with a feature of the present invention, the hydropneumatic suspension unit is provided with a vehicle level adjusting device which, in the illustrated embodiment of FIG. 1, is shown as being incorporated in the cylinder head 14 of the cylinder body 10. In FIG. 1, the vehicle level adjusting device, indicated at 32, includes hydraulic fluid inlet and outlet passageways 34 and 36 which are formed in the cylinder head 14. The hydraulic fluid inlet passageway 34 is axially spaced from the hydraulic fluid outlet passageway 36 and is hydraulically connected to a suitable source of hydraulic fluid under pressure, though not shown, for introducing a hydraulic fluid under pressure into the cylinder chamber 12. The outlet passageway 36, which is located axially below the inlet passageway 34, serves as a drain for draining off excessive hydraulic fluid under pressure from the cylinder chamber 12.

A floating piston 38 is tightly and slidably accommodated in an axial bore 40 formed in the cylinder head 14. A piston chamber 42 is defined by an end wall 40a of the axial bore 40 and an upper face of the floating piston 38. The floating piston 38 has a plurality of lands 44, 46, 48 and 50, which are axially spaced from each other by a plurality of annular recesses 52, 54 and 56. The floating piston 38 also has an axial bore 58 which opens to the piston chamber 42 and which is closed at the lower end of the floating piston 38.

An orifice or restricted through passage 60 is formed in the lower end of the valve spool 38 which provides fluid communication between the axial bore 58 and the cylinder chamber 12. The orifice 60 thus permits hydraulic fluid to flow into the piston chamber 42 from the cylinder chamber 12 for precluding objectionable movements of the floating piston 38 due to relative motions of the cylinder body 10 and the piston 16 caused by irregularities of the road surface over which the motor vehicle is travelling.

As shown, the floating piston 38 is further formed with first and second radially extending bores 62 and 64, which intersect the annular recesses 54 and 56 of the floating piston 38 and which communicate through the axil bore 58 formed therein with the piston chamber 42. It is to be noted that each of the radially extending bores 62 and 64 are sized to be larger in cross section than the orifice or restrictor 60 for a reason to be subsequently discussed. It is also to be noted that the inlet passageway 34 is opened and closed by the land 46 of the floating piston 38 while the outlet passageway 36 is opened and closed by the land 44.

As seen in FIG. 1, a hydraulic fluid passageway 66 is formed in the cylinder head 14 so as to communicate with the cylinder chamber 12. The hydraulic fluid passageway 66 is shown as extending axially and has first and second branch passageways 68 and 70 which open to the axial bore 40 formed in the cylinder head 14. The passageway 66 and branch passageway 70 serve as a bypass passageway of the restricted passageway 60. The first branch passageway 68 is spaced axially below the second branch passageway 70 and is selectively brought into fluid communication with either one of the inlet and outlet passageways 34 and 36 so that hydraulic fluid under pressure is passed into or out of the cylinder chamber 12. The second branch passageway 70 is axially spaced from the first branch passageway 68 at a suitable distance and, hence, the second branch passageway 70 is selectively brought into fluid communication with either one of the radial bores 62 and 64 of the floating piston 38 by actions of the land 48.

As shown in FIG. 1, a compression spring 72 is disposed in the axially extending bore 19 for biasing the valve spool 38 to a first adjusting position, that is, to a position in which the inlet passageway 34 is brought into fluid communication with the first branch passageway 68 so that hydraulic fluid under pressure is introduced into the cylinder chamber 12 and in which the second branch passageway 70 is brought into fluid communication with the radial bore 62 of the spool 38 so that hydraulic fluid under pressure is delivered into the piston chamber 42. To this end, the compression spring 72 engages at its lower end the spring seat 19a and at its upper end a flange 74 secured to the lower end portion of the floating piston 38. Additionally, a compression spring 76 is disposed in the piston chamber 42 for biasing the floating piston 38 in a second position in which the first branch passageway 68 is brought into fluid communication with the outlet passageway 36 for draining off the excess hydraulic fluid under pressure from the cylinder chamber 12 and in which the second branch passageway 70 is brought into fluid communication with the radial bore 64 for draining off the excess hydraulic fluid under pressure from the piston chamber 42. The forces of the compression springs 72 and 76 are so selected as to cause the floating piston 38 to remain in a third or neutral position shown in FIG. 1 in which the inlet and outlet passageways 34 and 36 are closed by the lands 46 and 44 of the valve spool 38, respectively, and the second branch passageway 70 is closed by the land 48 of the floating piston 38.

As previously mentioned, the hydropneumatic suspension unit thus constructed is adapted to be connected between the vehicle underbody structure and the wheel supporting means such as an axle.

Normally, the effective length of the hydropneumatic suspension unit is maintained at a substantially constant value irrespective of the weight and load of the motor vehicle. The hydropneumatic suspension unit assumes the position shown in FIG. 1 in which the body of the motor vehicle is maintained at a predetermined level relative to ground and in which the pressure of the hydraulic fluid in the cylinder chamber 12 is sufficient to support the weight and load of the motor vehicle.

When the motor vehicle is in motion and its load and weight are constant, inequalities in the road surfaces over which the motor vehicle is travelling cause relative movements between the vehicle underbody structure and the wheel supporting means which are accompanied by relative axial movement between the cylinder and the piston resulting in pressure and volume variations of the hydraulic fluid in the cylinder chamber 12. In this condition, the volume in the chamber 12 fluctuates and the pneumatic spring 21 absorbs or desorbs the fluctuating amount of hydraulic fluid through the passage 30 into and out of the fluid chamber 28 with the result that the gas in the chamber 26 is compressed or expanded to compensate for the volume variations of the hydraulic fluid in the cylinder chamber 12. The pressure in the chamber 12 is dampened by means of the restricted through-passage 60 formed in the floating piston 38. Under this condition, the floating piston 38 is maintained substantially stationary relative to the cylinder head 19 because of the restriction of flow of hydraulic fluid through the passage 60 of the floating piston 38 and because of the opposing forces of the compression springs 72 and 76 so that the inlet and outlet passageways 34 and 36 are kept closed by the lands 46 and 44 of the floating piston 38.

If the load of the motor vehicle is increased, the hydropneumatic suspension unit is compressed with the cylinder body 10 moved downwardly that is, toward the axle carried by the mounting eye 20. This causes the floating piston 38 to move upwardly, that is, to its first position by the action of the compression spring 72 against the opposing force of the compression spring 76. The first branch passageway 68 is consequently brought into fluid communication with the inlet passageway 34 and, at the same time, the second branch passageway 70 is brought into alignment with the annular recess 54 of the valve spool 38 so that the second branch passageway 70 communicates with the piston chamber 42 through the radial bore 62 and the axial bore 58 formed in the floating piston 38. Under this circumstance, hydraulic fluid under pressure is allowed into the cylinder chamber 12 through the hydraulic fluid passageway 66 in the cylinder head 14. Hydraulic fluid under pressure supplied to the cylinder chamber 12 then acts on the piston 16 to extend the hydropneumatic suspension unit with the cylinder body 10 moved upwardly, that is, away from the axle until the floating piston 38 is brought into its balanced position as shown in FIG. 1. with the spring unit 21 absorbing a portion of the increased fluid volume. In this position, the effective length of the hydropneumatic suspension unit is restored to its predetermined value in which the body of the vehicle is maintained at its predetermined level relative to ground.

If, on the contrary, the load of the motor vehicle is decreased, the cylinder body 10 is moved upwardly away from the axle so that the total length of the suspension unit increases with a resultant decrease in the pressure in the hydraulic fluid in the cylinder chamber 12 and the spring unit 21. This causes the valve spool 38 to move downwardly, that is, to the second position by the action of the compression spring 76 against the force of the compression spring 72. The first branch passageway 68 is thus brought into fluid communication with the outlet passageway 36 while the second branch passageway 70 is brought into fluid communication with the radial bore 64 of the floating piston 38. Under this circumstance, the excess hydraulic fluid in the cylinder chamber 12, the spring unit 21, and the piston chamber 42 is drained off therefrom through the hydraulic fluid passageway 66. The cylinder body 10 is thus permitted to move downwardly and, therefore, the effective length of the suspension unit is reduced to cause the valve spool 38 to move to its balanced position as shown in FIG. 1. Accordingly, the body of the vehicle is restored to the predetermined level as already discussed hereinabove.

It should be understood from the foregoing description that during operation of the vehicle level adjusting device 32 the second branch passageway 70 communicates with the piston chamber 42 through either one of the radial bores 62 and 64 of the floating piston 38 each of which is larger in diameter than the orifice or restrictor 60 of the floating piston 38 and, consequently, the floating piston 38 is quickly movable in either direction. Thus, the vehicle level adjusting device 32 is capable of quickly adjusting the level of the vehicle. It should also be noted that since the floating piston of the vehicle level adjusting device 32 is adapted to move as fast as possible to assume its balanced position in which the motor vehicle is maintained at the predetermined level, excessive amounts of fluid supply or exhaust is significantly reduced and therefore, the fluid consumption is decreased.

Figure 2:
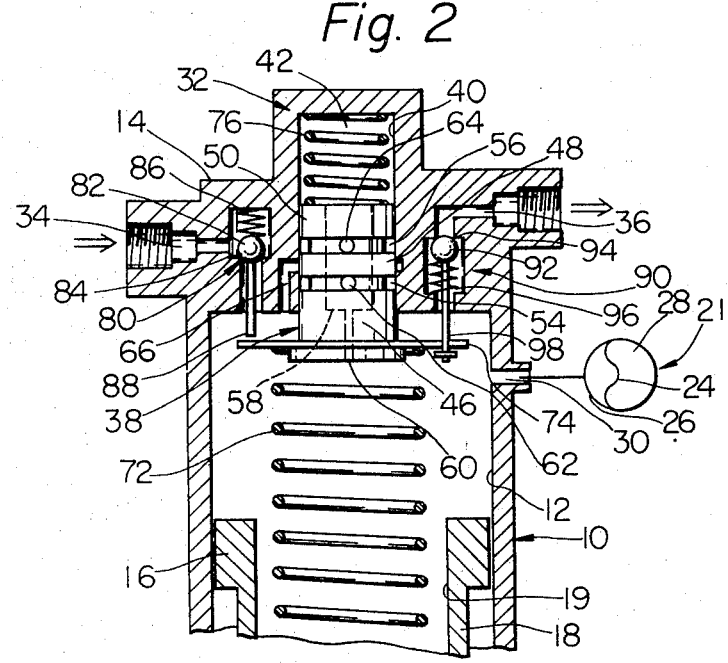
FIG. 2 is a fragmentary cross-sectional view of a modified form of the hydropneumatic suspension unit according to the present invention.

Although the hydraulic fluid inlet and outlet passageways 34 and 36 in the illustrated embodiment of FIG. 1 are shown as being controlled by the lands 46 and 44 of the floating piston 38 slidably accommodated in the axial bore 40 of the cylinder head 14, the inlet and outlet passageways 34 and 36 may be opened and closed through the use of valve means which is arranged to cooperate with the floating piston. An example of the hydropneumatic suspension unit carrying out such a concept is illustrated in FIG. 2 in which only the upper portion of the unit is shown for the sake of simplicity of illustration. In FIG. 2, the hydraulic fluid inlet and outlet passageways 34 and 36 are formed in the cylinder head 14 so as to directly communicate with the cylinder chamber 12. A first ball check valve 80 is positioned in the inlet passageway 34 to open and close the same. The first ball check valve 80 is comprised of a ball 82 which is disengageably seated on a valve seat 84 formed in the inlet passageway 34, a compression spring 86 disposed in the inlet passageway 34 and urging the ball 82 to a position to close the inlet passageway 34, and a plunger 88 engaging at one end with the ball 82 and cooperating with the floating piston 38 to move the ball 82 against the action of the spring 86 to a position to open the inlet passageway 34. As shown, a second ball check valve 90 is disposed in the outlet passageway 36 to open and close the same. The second ball check valve 90 is comprised of a ball 92 disengageably seated on a valve seat 94 formed in the outlet passageway 36, a compression spring 96 urging the ball 92 to a position to close the outlet passageway 36, and a plunger 98 connected at one end with the ball 92 and movable against the force of the spring 96 to a position to open the outlet passageway 36 by a downward movement of the floating piston 38. In this connection it should be appreciated that the first ball check valve 80 is arranged to open the inlet passageway 34 when the floating piston 38 is moved to its first position, that is, upwardly of the drawing whereas the second ball check valve 90 is arranged to open the outlet passageway 36 when the floating piston 38 is moved to its second position, that is, downwardly of the drawing as mentioned. In the illustrated embodiment of FIG. 2, the floating piston 38 is shown as having, in addition to the axial bore 58 and the orifice or restrictor 60 communicating therewith, a plurality of lands 46, 48 and 50 which are axially spaced from each other by the annular recesses 54 and 56 as previously discussed. The radial bores 62 and 64 are formed in the floating piston 38 in a manner as already mentioned hereinabove. The hydraulic fluid passageway 66 is formed in the cylinder head 14 and communicates with the cylinder chamber 12. The hydraulic fluid passageway 66 is selectively brought into fluid communication with the piston chamber 42 through either one of the radial bores 62 and 64 when the floating piston assumes the first or the second piston and, when the floating piston 38 assumes the position shown in FIG. 2, that is, the balanced position, the hydraulic fluid passageway 66 is closed by the land 48 of the floating piston as shown in FIG. 2. The operation of the hydropneumatic suspension unit shown in FIG. 2 is similar to that of the unit shown in FIG. 1 and, therefore, the detail discussion of the same is herein omitted.

In the illustrated embodiment of FIGS. 1 and 2, the floating piston 38 has been shown and described as being slidably accommodated in the axial bore 40 formed in the cylinder head 14, but, in an alternative construction, the floating piston 38 may be slidably disposed in the cylinder chamber 12. More specifically, the floating piston 38 having formed therein the orifice 60 is slidably received in the cylinder chamber 12 and the piston chamber 42 is defined by an upper face of the floating piston 38 and an upper end wall of the cylinder chamber 12. In the embodiment illustrated in FIG. 3, the floating piston 38 is held in its balanced position by the set of two compression springs 72 and 76, the spring 76 being disposed in the piston chamber 42. The floating piston 38 is adapted to open and close the ball check valves 80 and 90 disposed in the hydraulic fluid inlet and outlet passageways 34 and 36, respectively. In this arrangement, the ball check valves 80 and 90 respond to the movements of the floating piston 38 in a manner similar shown in FIG. 2 so that when the floating piston is moved to its first position, that is, upwardly as viewed in FIG. 3, the plunger 88 is moved upwardly against the force of the spring 86 thereby to open the ball check valve 80 whereas when the floating piston 38 is moved to its second position, that is, downwardly as viewed in FIG. 3, the plunger 98 is pulled downwardly to cause the ball 92 to be unseated from the valve seat 94. In the illustrated embodiment of FIG. 3, moreover, first and second hydraulic fluid bypass passageways 100 and 102 are formed in the cylinder head 14. These passageways 100 and 102 have functions similar to those of the annular recesses 54 and 56 of the floating piston 38 shown in FIGS. 1 and 2. More particularly, the first passageway 100 has a port 100a which is adapted to be opened and closed by a lower circumferential edge of the floating piston 38. Likewise, the second passageway 102 has a port 102a which is adapted to be opened and closed by an upper circumferential edge of the floating piston 38.

Figure 3:
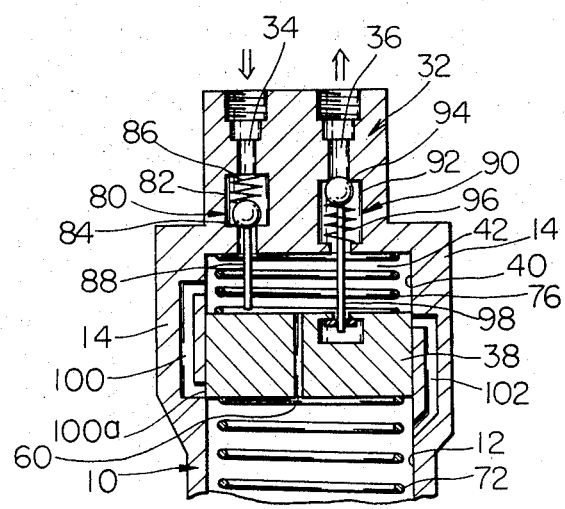
FIG. 3 is a view similar to FIG. 2 but shows another modified form of the hydropneumatic suspension unit according to the present invention.

As shown in FIG. 3, the port 100a of the first passageway 100 is located below the port 102a of the second passageway 102 in an axial direction so that when the floating piston 38 is moved to its first position, the port 100a is opened to establish fluid communication between the piston chamber 42 and the cylinder chamber 12 thereby allowing hydraulic fluid under pressure into the cylinder chamber 12, whereas, when the floating piston 38 is moved to its second position, the port 102a of the second passageway 102 is opened to drain the excess hydraulic fluid in the cylinder chamber 12 into the piston chamber 42 from which the excess hydraulic fluid is discharged through the outlet passageway 36. It should be noted that each of the first and second passageways 100 and 102 has a cross sectional area larger than that of the orifice 60 for the reason described hereinabove.

Figure 4:
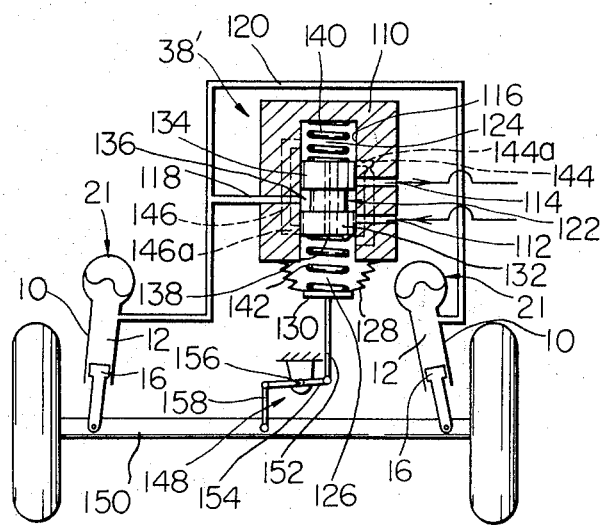
FIG. 4 is a cross-sectional view of another embodiment of the hydropneumatic suspension unit according to the present invention.

Although, in the illustrated embodiments of FIGS. 1 to 3, the vehicle level adjusting device 32 has been shown and described as being formed integrally with the cylinder head 14 of the unit, in an alternative construction the vehicle level adjusting device can be separated from the unit. As illustrated in FIG. 4, the vehicle level adjusting device which is generally designated by reference numeral 38' comprises a casing or hollow member 110 which is separated from the cylinder body 10 of the hydropneumatic suspension unit. The casing 110 may be preferably mounted on the vehicle underbody structure and has formed therein hydraulic fluid inlet and outlet passageways 112 and 114. The hydraulic fluid inlet passageway 112 is located below the outlet passageway 114 in an axial direction and is hydraulically connected to the source of hydraulic fluid under pressure in a conventional manner. The hydraulic fluid outlet passageway 114 serves as a drain through which excessive hydraulic fluid is drained off. The casing 110 also has formed therein an axially extending bore 116 which communicates with the inlet and outlet passageways 112 and 114. A hydraulic fluid passageway 118 is formed in the casing 110 and communicates at one end with the axially extending bore 116 at a point intermediate the inlet and outlet passageways 112 and 114. The fluid passageway 118 also communicates at its other end with a conduit 120 which is hydraulically connected to the cylinder chambers 12 of the respective hydropneumatic suspension units. A floating piston or spool 122 is slidably received in the axial bore 116 and divides the axial bore 116 into first and second piston chambers 124 and 126. The second piston chamber 126 is closed by a flexible cover 128 combined with an annular plate 130. The floating piston 122 has first and second valve lands 132 and 134 which are axially spaced from each other by an annular recess 136. The floating piston is formed with an orifice 138 axially extending therethrough. The floating piston 122 is normally held in its balanced position by two compression springs 140 and 142 which are disposed in the first and second piston chambers 124 and 126 respectively. As shown in FIG. 4, the f floating piston closes the hydraulic fluid inlet and outlet passageways 112 and 114 when the floating piston assumes the balanced position. As seen in FIG. 4, the casing 110 is formed with first and second axially extending hydraulic fluid bypass passageways 144 and 146 which provides fluid communication between the first and second piston chambers 124 and 126. The first axially extending hydraulic fluid passageway 144 has a port 144a which is opened and closed by the valve land 134 of the floating piston 122. Similarly, the second axially extending hydraulic fluid passageway 146 has a port 146a which is opened and closed by the valve land 132 of the floating piston 122. It is to be noted that the port 144a of the first passageway 144 is arranged to be opened when the floating piston 122 assumes the first position in which the hydraulic fluid inlet passageway 112 is brought into fluid communication with the passageway 118 while the port 146a is opened when the floating piston 122 is moved to its second position in which the hydraulic fluid outlet passageway 114 is brought into fluid communication with the passageway 118. In order to make the floating piston to respond to the level of the vehicle, the annular plate 130 on which the lower end of the second compression spring 142 is mounted is connected to the axle which is designated by the reference numeral 150 through a mechanical linkage 148. The mechanical linkage 148 is comprised of a first rod 152 having one end secured to the lower surface of the annular plate 130 and the other end rotatably connected to one end of an arm 154. The arm 154 is pivotally mounted on a shaft 156 fixed to a part of the vehicle body. The linkage also comprises a second rod 158 having one end rotatably connected to the other end of the arm 154 and the other end pivotally connected to the axle 150. It should be appreciated that the vehicle level adjusting device shown in FIG. 4 is mounted between the vehicle underbody structure and the axle 150 and connected with each of the hydropneumatic suspension units to maintain the body of the vehicle at a substantially constant level.

The operation of the vehicle level adjusting device 38' shown in FIG. 4 is otherwise the same as the arrangement described with reference to FIGS. 1, 2 and 3 and need not be further described herein.

It will now be appreciated from the foregoing description that the hydropneumatic suspension unit according to the present invention incorporates therein a novel vehicle level adjusting device which is adapted to quickly adjust the vehicle body to a substantially constant level irrespective of the weight and load of the vehicle.

It will also be understood that the hydropneumatic suspension unit according to the present invention has a novel vehicle level adjusting device which is adapted to minimize fluid consumption during operation thereof.

It will further be noted that the hydropneumatic suspension unit embodying the present invention is simple in construction and easy to manufacture.

What is claimed is:

1. A hydropneumatic suspension unit adapted to mounted between a vehicle body and wheel supporting means, comprising a cylinder defining therein a cylinder chamber filled with pressurized fluid, the volume of said cylinder chamber being variable in response to variations in the load of a vehicle body to allow retraction and extension of said suspension unit, said cylinder chamber being fluidly communicable with a pressurized fluid source and with a drain, valve means disposed between said source and said cylinder chamber and between said drain and said cylinder chamber to normally block fluid communication therebetween and operable in response to increases and reductions in the load of said vehicle body to establish fluid communication between said source and said cylinder chamber to cause supply of pressurized fluid thereinto for extension of said suspension unit and between said drain and said cylinder chamber to cause discharge of fluid therefrom for retraction of said suspension unit thereby maintaining the height of said vehicle body substantially constant independently of the load of said vehicle body, a hollow member, a floating piston slidably disposed in said hollow member, said hollow member having therein a first fluid chamber at one end of said floating piston and a second fluid chamber at the other end of said floating piston, said floating piston having formed therethrough a restricted passageway interconncecing said first and second fluid chambers, said hollow member having formed therein a bypass passageway opening at one end into said first fluid chamber and fluidly communicable at the other end with said second fluid chamber, said floating piston controlling fluid communication between said bypass passageway and said second fluid chamber and being held in a neutral position to block said fluid communication therebetween when said valve means blocks said fluid communication between said cylinder chamber and said source and between said cylinder chamber and said drain and being movable to first and second operative positions to extablish said fluid communication between said bypass passageway and said second fluid chamber when said valve means establishes said fluid communication between said source and said cylinder chamber and between said drain and said cylinder chamber, and two biasing means urging said floating piston in opposite directions to resiliently hold the same in said neutral position.

2. A hydropneumatic suspension unit as claimed in claim 1, in which said hollow member is integral with said cylinder and said first fluid chamber is aligned with said cylinder chamber.

3. Hydropneumatic suspension unit as claimed in claim 2, in which said floating piston has formed therein first and second annular recesses and a bore opening into said second fluid chamber and communicating with said first and second annular recesses, said first annular recess communicating with said bypass passageway when said floating piston is in said second operative position, said second annular recess communicating with said bypass passageway when said floating piston is in said first operative position.

4. A hydropneumatic suspension unit as claimed in claim 3, in which said hollow member has formed therein an inlet passageway communicating with said pressurized fluid source, an outlet passageway communicating with said drain, and a branch passageway communicating with said bypass passageway, and in which said valve means comprises said floating piston, said floating piston having further formed therein a third annular recess which provides fluid communication between said inlet passageway and said branch passageway when said floating piston is in said first operative position and between said outlet passageway and said branch passageway when said floating piston is in said second operative position.

5. A hydropneumatic suspension unit as claimed in claim 3, in which said hollow member has formed therein an inlet passageway communicating with said pressurized fluid source and opening into said first fluid chamber and an outlet passageway communicating with said drain and opening into said first fluid chamber, and in which said valve means comprises a first valve member disposed in said inlet passageway to normally block the same and a second valve member disposed in said outlet passageway to normally block the same, said first and second valve members being operated by means on said floating piston to positions to open said inlet and outlet passageways, when said floating piston is moved to said first and second operative positions, respectively.

6. A hydropneumatic suspension unit as claimed in claim 2, in which said bypass passageway is openable at said other end into said second fluid chamber, and in which said hollow member has further formed therein a second bypass passageway openable at one end into said first fluid chamber and opening at the other end into said second fluid chamber, said floating piston closing said other end of said first bypass passageway and said one end of said second bypass passageway when it is in said neutral position and opening said other end of said first bypass passageway when it is in said second operative position and said one end of said second bypass passageway when it is in said first operative position.

7. A hydropneumatic suspension unit as claimed in claim 6, in which said hollow member has formed therein an inlet passageway communicating with said pressurized fluid source and opening into said second fluid chamber and an outlet passageway communicating with said drain and opening into said second fluid chamber, and in which said valve means comprises a first valve member disposed in said inlet passageway to normally block the same and second valve member disposed in said outlet passageway to normally block the same, said first and second valve members being operated by said floating piston to positions to open said inlet and outlet passageways, when said floating piston is moved to said first and second operative positions, respectively.

8. A hydropneumatic suspension unit as claimed in claim 1, in which said hollow member has formed therein an inlet passageway communicating with said pressurized fluid source, an outlet passageway communicating with said drain and a fourth passageway communicating with said cylinder chamber, and in which said valve means comprises said floating piston, said floating piston having formed therein an annular recess which provides fluid communication between said inlet passageway and said fourth passageway when said floating piston is in said first operative position and which provides fluid communication between said outlet passageway and said fourth passageway when said floating piston is in said second operative position.

9. A hydropneumatic suspension unit as claimed in claim 8, in which said bypass passageway is openable at said other end into said second fluid chamber, and in which said hollow member has further formed therein a second bypass passageway openable at one end into said first fluid chamber and opening at the other end into said second fluid chamber, said floating piston closing said other end of said first bypass passageway and said one end of said second bypass passageway when it is in said neutral position and opening said other end of said first bypass passageway when it is in said first operative position and said one end of said second bypass passageway when it is in said second operative position.

* * * * *